United States Patent
Candelaria et al.

[19]

[11] Patent Number: 5,815,656
[45] Date of Patent: Sep. 29, 1998

[54] METHOD OF VALIDATING MEMORY STRUCTURES IN DATA PROCESSING SYSTEMS

[75] Inventors: Susan Kay Candelaria; Michael Howard Hartung, both of Tucson, Ariz.; Dennis Albert Kukula, Henderson, Nev.; Kenneth Wayne Lane; Vernon John Legvold, both of Tucson, Ariz.; Guy Eugene Martin, Austin, Tex.; John Norbert McCauley, Jr., Tucson, Ariz.; Carol Santich Michod, Tucson, Ariz.; Mark Albert Reid, Tucson, Ariz.; William Lee Richardson, Tucson, Ariz.

[73] Assignee: International Business Machines Corporation, Armonk, N.Y.

[21] Appl. No.: 949,668
[22] Filed: Sep. 23, 1992
[51] Int. Cl.⁶ ..................................................... G06F 11/00
[52] U.S. Cl. ................................. 395/185.07; 395/185.01; 395/185.02
[58] Field of Search ..................................... 395/575, 600, 395/650, 281.3; 364/962, 974, 974.1, 974.2, 974.3, 979.5, 974.4, 974.5, 974.7, 281.3, 281.4, 281.5, 281.6, 281.7, 281.8, 281.9, 281, 282.1, 282.2, 282.3, 282.4, 283.1, 283.2, 283.3, 283.4

[56] References Cited

U.S. PATENT DOCUMENTS

| 4,325,120 | 4/1982 | Colley et al. | 395/375 |
|---|---|---|---|
| 4,498,145 | 2/1985 | Baker et al. | 395/600 |
| 4,507,751 | 3/1985 | Gawlick et al. | 395/575 |
| 4,530,054 | 7/1985 | Hamstra et al. | 395/550 |
| 4,646,229 | 2/1987 | Boyle | 395/600 |
| 5,043,871 | 8/1991 | Nishigaki et al. | 395/600 |
| 5,095,421 | 3/1992 | Freund | 395/650 |
| 5,109,511 | 4/1992 | Nitta et al. | 395/650 |
| 5,193,162 | 3/1993 | Bordsen et al. | 395/425 |
| 5,197,148 | 3/1993 | Blount et al. | 395/575 |
| 5,201,044 | 4/1993 | Frey, Jr. et al. | 395/575 |
| 5,280,611 | 1/1994 | Mohan et al. | 395/600 |

*Primary Examiner*—Robert W. Beausoliel, Jr.
*Assistant Examiner*—P. Vales
*Attorney, Agent, or Firm*—Robert M. Sullivan; Andrew J. Dillon

[57] ABSTRACT

A data processing system executes a plurality of processes in parallel. The processes access shared user records stored in memory serially. One or more data structures are used to track access by processes to the data structures and to the user records. Responsive to a fault occurring in a first parallel process, a signal is given the remaining parallel processes indicating the failure. Responsive to the failure, it is determined if the faulting parallel process had access to one of the data structures. Depending upon the circumstances of access, integrity of the user records may be assumed and the record validated. The data structures themselves can be examined to determine if the contents of memory is reliable. Typically the data structures support use of the memory as a cache.

14 Claims, 8 Drawing Sheets

METHOD OF VALIDATING MEMORY STRUCTURES IN DATA PROCESSING SYSTEMS

BACKGROUND OF THE INVENTION

1. Technical Field

The invention relates to data processing, and more particularly relates to data processing systems where two or more processes share user records. More particularly, the invention relates to a method of validating user records in data storage after failure of a processor owning the data record.

2. Description of the Related Art

Common architectures for computers having multiple levels of storage for data provide for processor access to data resident in faster, smaller levels. Lower levels of data storage are generally much larger and slower than the higher levels. The lowest levels generally contain copies of virtually all records and programs used on a computer. Newly generated records never destaged to the lower levels and newly modified records are the most important pieces of data which either do not exist in the lower levels or which are inconsistent with the contents of the lower levels. Examples of such records are new and modified word processing documents. The lower levels are generally considered the more protected version of the data. The lower levels are provided by devices in which the data is relatively immune to loss from power failure among other hazards.

As suggested above, records in contemporary upper level stores are vulnerable to several hazards, including power failures and address generator failures. Such records have also been considered vulnerable to fault occurring in a processing unit of a computer. Though records may be accessible by more than one process, or processor, a record which has been staged to a higher level is typically owned by a particular processing unit of the computer, or by a process executing on the processor. A particular processor, or process executing on a processor, will usually have an exclusive right to modify the record. When fault occurs in the owning processor or process the modified record has been considered lost as well, even though it may be intact. It should be apparent that the modified record may be more valuable than the unmodified version.

The invention has particular applicability to multiple processor or multiple process environments. An example of such an environment is found in main frame computer systems accessing a common array of disk drive units.

Main frame computer systems generally use auxiliary storage devices in the lower levels of data storage. In auxiliary storage devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD, pronounced "dasdee") are one type of auxiliary storage device. In a direct access storage device access time to data is independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage controller is logically positioned between the DASDs and the host computers. The storage controller handles connection and disconnection between a particular computer and magnetic disk unit for transfer of a data record.

The IBM 3990 storage controller, which is available from International Business Machines Corporation, is an example of a storage controller used to control connections between magnetic disk units and host computers. The IBM 3990 Model 3 type controller can handle up to sixteen channels from host computers and up to sixty-four magnetic storage units. Within the storage controller are two multiple path storage directors and four storage paths, two of which are associated with each multiple path storage director. Each multipath storage director may be connected to up to eight incoming channels from host computers, for a total of sixteen channels for the storage controller as a whole. Each multipath storage director is connected to two storage paths, thus functioning as an 8×2 switch.

Channels are physical links between the storage controller and the host computers. Usually, a host computer has two or four channels, half being physically connected to the one multipath storage director and the other half being connected to the other multipath storage director. Each storage path is connected to all of the available magnetic disk units. Upon indication that a disk is ready, the controller can secure any one of a plurality of the channels and storage paths back to a host to establish a data path. It is a feature of the IBM 3990 storage controller that an input/output transaction between a host computer and a magnetic disk unit may be broken into two separate connections, which may be handled along distinct channels and storage paths. A request need not be responded to over the same channel on which it was received. This feature increases throughput through the storage controller, because during the disconnect period the storage controller handles other tasks, such as a connection for another computer with another DASD.

While each storage path is in effect a stand alone control unit based upon its own microprocessor, the storage paths share control information through a common memory space for synchronization functions for handling connections, disconnections and reconnections relating to a transaction. A storage controller is in effect a dedicated purpose, multiple processor computer. Each storage path in a storage control unit has access to three addressable memory devices used for supporting storage control unit operation. The three memory devices are: a shared control array (SCA); a cache; and non-volatile storage.

Cache is best known for its application as an adjunct to computer memory, where cache is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. The contents of cache are duplicated in system memory.

Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducers used to read and write the data. By duplicating frequently accessed data in cache, read time for data is reduced and data storage system throughput is considerably enhanced. High speed components are expensive in terms of cost per byte of storage, particularly when compared with magnetic media storage and thus cache is quite small compared to the memory device.

In the IBM 3990 Model storage controller, storage controller cache has also been used to provide a buffering function for some data being written to a DASD device. In the IBM 3990 Model storage controller, data is conventionally stored to storage controller cache by track images. For fast write operations each track image corresponds to the contents of a physical track from a direct access storage device. Where a track image is present in cache, a write command from a host computer updating a record of the track results in the record being written over the corresponding record in the track image rather than to DASD. This is referred to as a "write hit." Time is saved over waiting for the disk to come to the correct position for direct transfer of the data from the host computer. Then, as a background process, the storage controller can destage data from cache to disk to update a record.

The storage controller issues "channel end" and "device end" signals upon successful writing of data. To obtain the benefits of increased throughput promised by writing data intended for a direct access storage device to a buffer, the storage controller must issue the signals indicating that the data has been successfully written. However, cache is volatile while magnetic media are not. Data that are in cache are lost in case of power failure. Data written to magnetic media are simply unaccessible until power is restored. To the host computer, a successful write of data requires that the data be relatively immune to loss from common hazards.

Nonvolatile storage (NVS) was added to the storage controller as a backup to cache for its buffering function. Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS indication is given to the host computer that the data are successfully stored.

Power supply system interruptions can none-the-less cause problems. On so-called "modular" systems two storage paths and the nonvolatile storage systems are supplied by a first power source. The remaining two storage paths and the cache are powered by a second power source. A fault in the first power source results in an asynchronous stoppage in two storage paths and prevents access to the nonvolatile storage by other storage paths. The remaining storage paths obtain operational status of the failed storage paths from an external register and therefore recognize the problem. The active storage paths will attempt a reinitialization of the failed storage paths. However, lacking run-time knowledge of where in the code the failed storage paths were, the reinitialization process has proceeded on the basis that the cache data structures had become incongruent. Thus host systems lose access both to nonvolatile storage and cache.

Another problem is the length of time needed to destage data from nonvolatile storage. An upper time limit for destaging a full nonvolatile storage system where the data is highly fragmented can reach 100 seconds. In some systems, such as airline reservation systems, such a delay is excessive.

SUMMARY OF THE INVENTION

It is an object of the invention to provide a method of managing a data storage system in a data processing system.

It is an object of the invention to provide a method of validating user records and caching data structures in a multiple process or multiple processor computer upon failure of a process or processor owning the records or having had a lock to the data structures.

It is a further object of the invention to exploit the cache in a storage controller to increase operating speed of the storage controller.

The foregoing objects are achieved as is now described. A data processing system executes a plurality of processes in parallel. The processes access shared user records stored in memory serially. One or more data structures are used to track access by processes to the data structures and to the user records and to support use of the memory as a cache. Responsive to a fault occurring in a first parallel process, a signal is given the remaining parallel processes indicating the failure. Responsive to the failure, it is determined if the faulting parallel process had access to one of the data structures. Depending upon the circumstances of access, integrity of the user records may be assumed and the record validated. The data structures themselves can be examined to determine if the contents of memory is reliable.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
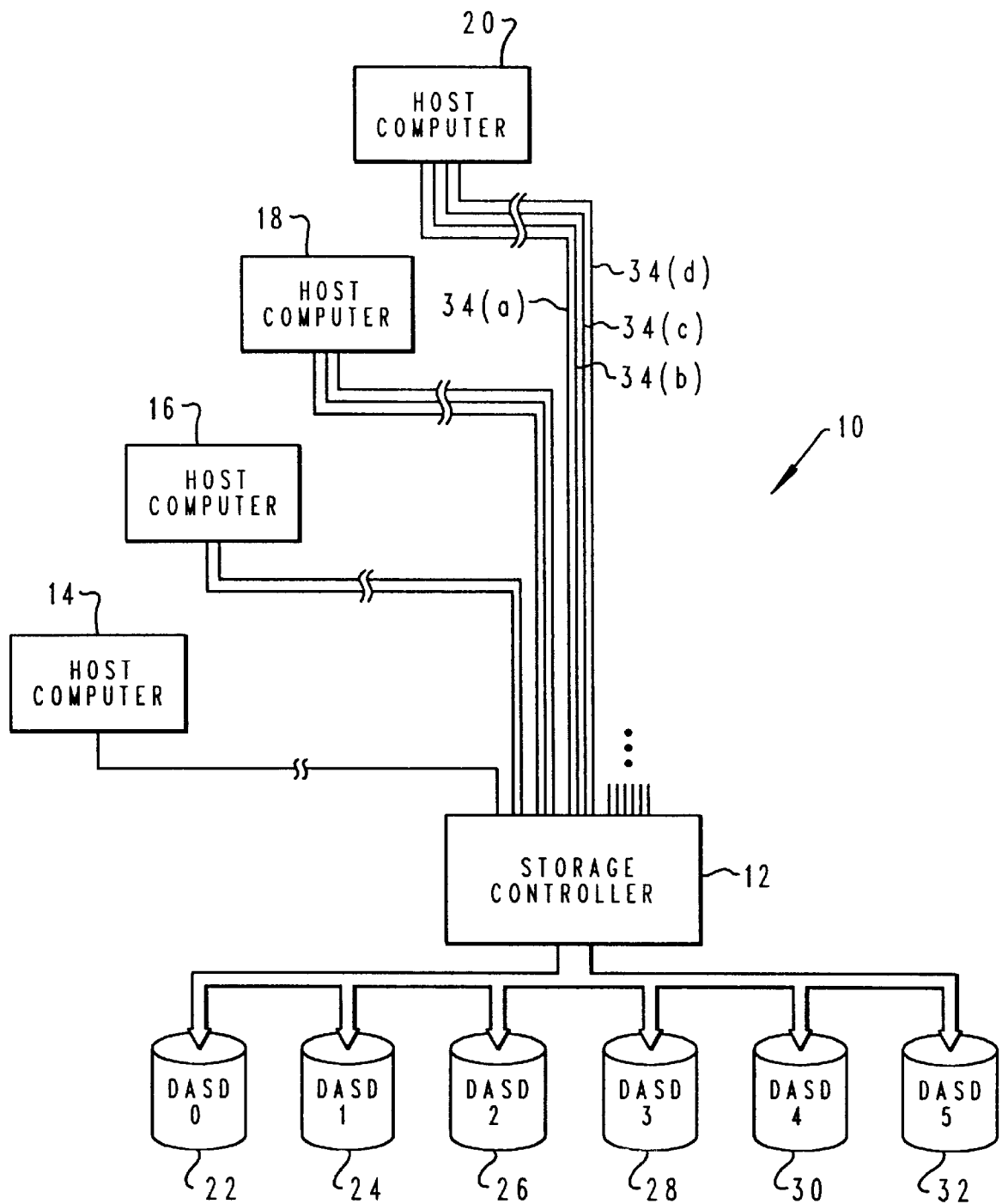
FIG. 1 is a block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, such as disk drives. Storage units 22–32 are also connected to storage controller 12 for selective connection for communication with host computers. Storage controller 12 is preferably an IBM 3990 Model 3 type controller, which is available from IBM Corporation. Host computers 14–20 are typically main frame systems such as the IBM 3090, the ES9000 Model computer, or comparable systems. Host computers 14–20 are connected to storage controller 12 by at least one and by up to four channels. For example, host computer 20 is connected to storage controller 12 by channels 34(a), 34(b), 34(c) and 34(d). The channels come in two types, parallel data channels and serial data channels. Certain optical serial channels are used for data transmission up to 20 kilometers. Parallel channels utilize electrical signals and are generally not used at distances of greater than about 125 meters.

Figure 2:
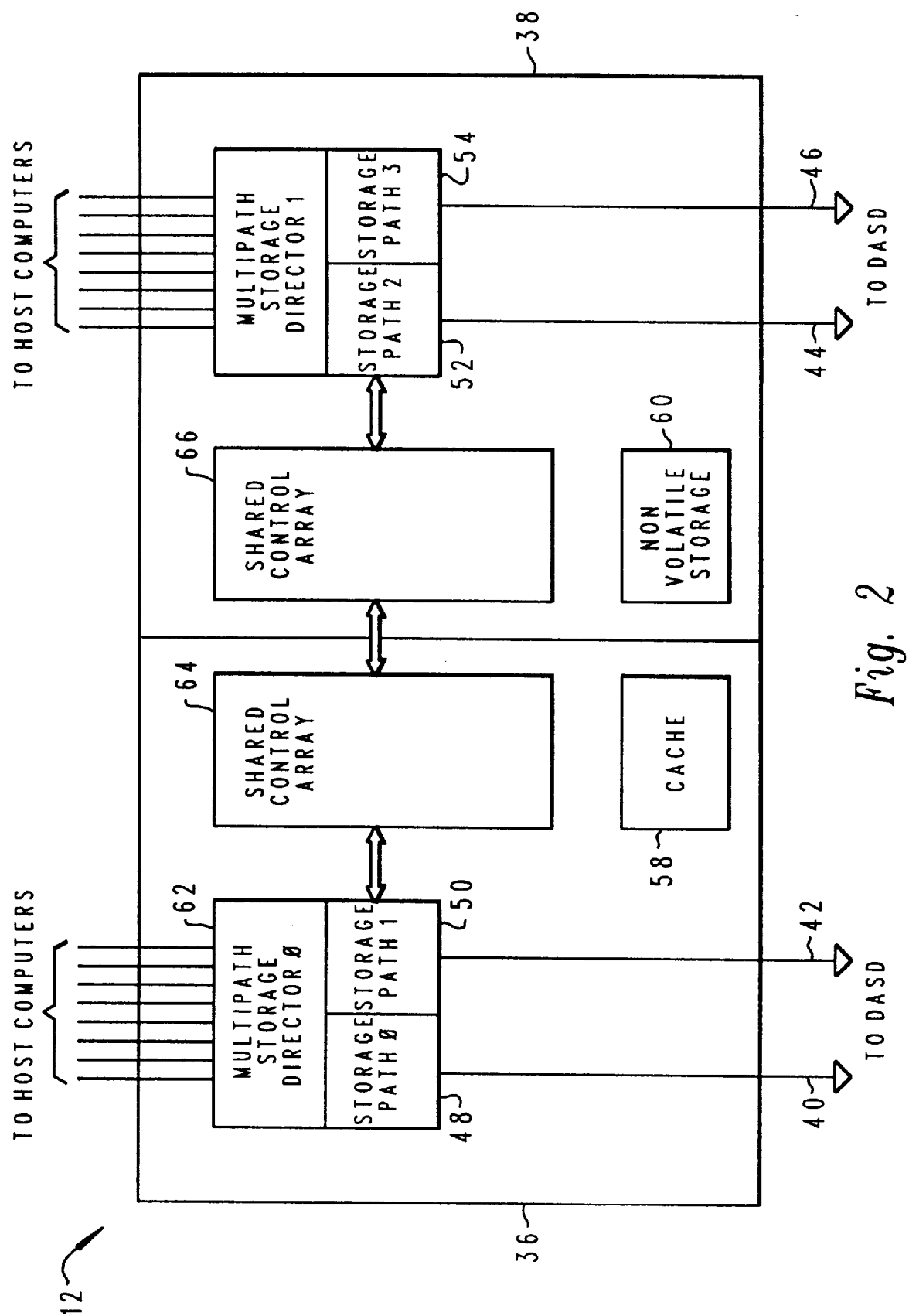
FIG. 2 is a block diagram of a storage controller from the data processing system of FIG. 1.

FIG. 2 depicts storage controller 12 in greater detail. Storage controller 12 has two storage clusters 36 and 38, each of which provides for selective connection between a host computer and a direct access storage device. Although four host computer systems and six direct access storage devices are depicted in FIG. 1, storage controller 12 can handle additional channels and direct access storage devices.

Data from a given host computer system may be stored to any of the direct access storage devices. Data may also be recovered from any of the direct access storage devices for a given host computer. Where a host computer is connected by at least two channels, one each is connected to storage cluster 36 and 38. Similarly, where four channels are provided, two are connected to storage cluster 36 and two to storage cluster 38. Storage controller 12 may receive a request from a host computer over a channel, and respond to the request over any one of the channels connected to the same host computer. The channels associated with one host computer are known as a path group. Storage controller 12 has knowledge of the path groups, having received it from each host computer.

Storage controller 12 has four paths 40, 42, 44 and 46 to the direct access storage devices. Each data path 40–46 is associated with one of storage path processors 48–54, respectively. Each data path goes to all of the direct access storage devices. Only one data path has access to a direct access storage device at a time however. Because storage controller 12 attempts to synchronize disconnects and reconnects between direct access storage devices and host computers based upon rotational position of a disk in the direct access storage device, storage controller 12 may be seen to operate, in essence, as a data transfer traffic manager. An objective of the traffic management scheme is to respond to requests received over the channels to the host computers as quickly as possible. One way to meet this objective is to keep the storage path processors occupied with data moving between host computers and direct access storage devices.

The internal division of storage controller 12 corresponds to independent power supplies. Two independently powered sections are storage clusters 36 and 38. Cluster 36 includes a memory cache 58. Cluster 38 includes a nonvolatile storage 60. Cache 58 provides storage for frequently accessed data and for data buffering functions. Buffering updates of records in cache before writing the records to a DASD provides similar response times for cache write and read operations. Nonvolatile storage 60 is used to duplicate data written to cache until destaged from cache to a DASD. Temporary storage of data to be written to a storage device allows indication to a host that the storage operation is logically complete, notwithstanding the fact that actual destaging of the data from cache to a direct access storage device has not yet been completed.

Exclusive of cache 58 and nonvolatile storage 60, which are accessible by any storage path, storage clusters 36 and 38 mirror one another in terms of functional features. Accordingly only storage cluster 36 is described here. Storage cluster 36 includes a multipath storage director 62 which operates as a four or eight by two switch between the channels from the host computer systems and signal path processors 48 and 50. Storage cluster 36 also includes a shared control array 64, which duplicates the contents of shared control array 66 in storage cluster 38. Shared control arrays 64 and 66 store path group information as well as control blocks for the direct access storage devices. The shared control arrays may also be used for storage of some of the data structures utilized in controlling cache 58 and in practicing the method of the present invention, as described below. The data structures can also be stored in cache 58 depending upon the specific implementation.

Figure 3:
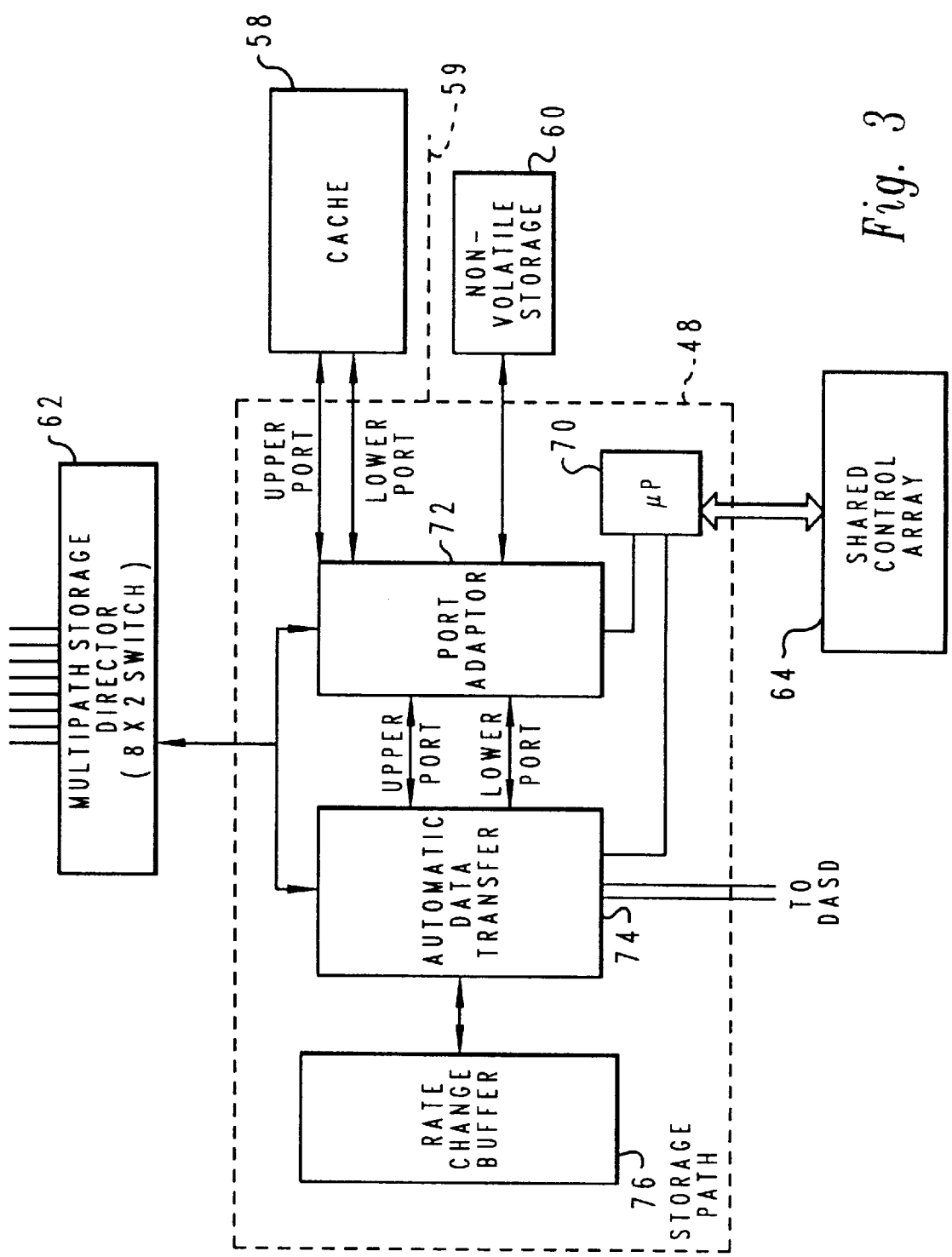
FIG. 3 is a block diagram of a storage path processor.

FIG. 3 illustrates signal processor 48 in a block diagram schematic. Signal path processor 48 is connected to multipath storage director 62 by an upper port and to a plurality of direct access storage devices by a lower port. Data transfer between the multipath storage director 62 and one of direct access storage devices during synchronous operations occurs via an automatic data transfer circuit 74 supported by a rate change buffer 76, if required. Rate change buffer 76 compensates for differences between the speed of data transference by disk drive type direct access storage devices and the operating speed of the channels to host computers. The channels typically handle data at a faster rate than the direct access storage devices.

A port adaptor 72 controls transfer of data between cache 58, nonvolatile storage 60 and the lower port. Port adapter 72 also controls transfer of data between cache 58 and the upper port. As discussed above, the presence of cache 58 and nonvolatile storage 60 provide for logical completion of certain data transfers without waiting for physical synchronization of disk and channel connection. All operations of signal path 48 are under control of a microcomputer 70.

Before data transfer can begin, the DASD control must be oriented. DASD control does that by detecting either the index point or the start-of-count area other than record zero. Once the count area, or index, has been detected, the DASD control can work its way down the track to perform the operations commanded by the channel program. After validating the locate record parameters, a storage path directs the DASD control to seek to a first-specified track, positions the device to the designated sector, and begins a search operation to further position itself to a particular record area on the track.

The IBM Model 3990 storage controller uses several data structures to support caching. Continued integrity and consistency of modified versions of the data structures after a storage path failure is used as indicia of continued integrity of user data records in cache. The first preferred embodiment applies to systems using track caching. One data structure present in track caching systems is the scatter index table (SIT). The SIT is a hash table providing indexes into directory entries for track images in cache. A record in DASD is uniquely described as to location by a device number, a cylinder and a track head. Operation of a hashing function on the location information returns a randomized offset into the scatter index table. The scatter index table may be located either in cache or in the shared control array, depending upon application.

The directory entry is a control block which indicates location of a track image in cache and the address in DASD of the unmodified track. If a track image is the subject of a channel command word chain, it is marked busy. An additional data structure is referred to as the track information block (TIB). The track information block has addresses for each record of a track that is in the cache. In the first preferred embodiment, a process accessing records listed in the TIB adds information relating to modification status of the record images. If a record image has been modified, but not destaged to DASD, it is listed as a modified record in the TIB. Such records must be destaged during any recovery procedure to avoid data integrity problems.

Records written as the result of both Update and Format write operations from a channel command word chain are referred to as modified records. An update write modifies a record existing on a DASD. A format write contains new records. Upon receipt of an Update chain, all records of a track image written by the channel program are scheduled modified as they are written. Modification is marked in the track information block which is in a special store owned by the storage path. The track information block is moved to cache when the operation completes.

Other structures exist to support cache operations which are not particular to track caching operations. The most important of these structures are the active lists, particularly the most recently used(MRU)/least recently used(LRU) list. A record holds its position in cache by virtue of its recent use. When a record is accessed by a read operation and the record is not in cache it is placed in cache. Space is freed for the record by reference to the least recently used list to locate the record in cache which has gone the longest period without access. The space occupied by the record at the bottom of the MRU/LRU list is released to provide room for the newly accessed record. Any record, upon use, enters the cache, however only those records which are repeatedly used remain in cache. Thus the cache tends to hold records of relatively greater frequency in use. The MRU/LRU list typically resides in cache.

Operational status of the storage paths is reflected in a joint array structure arbiter status external register. Running storage paths periodically access the external registers to determine if recovery processes need to be initiated for another failed storage path.

Figure 4A:
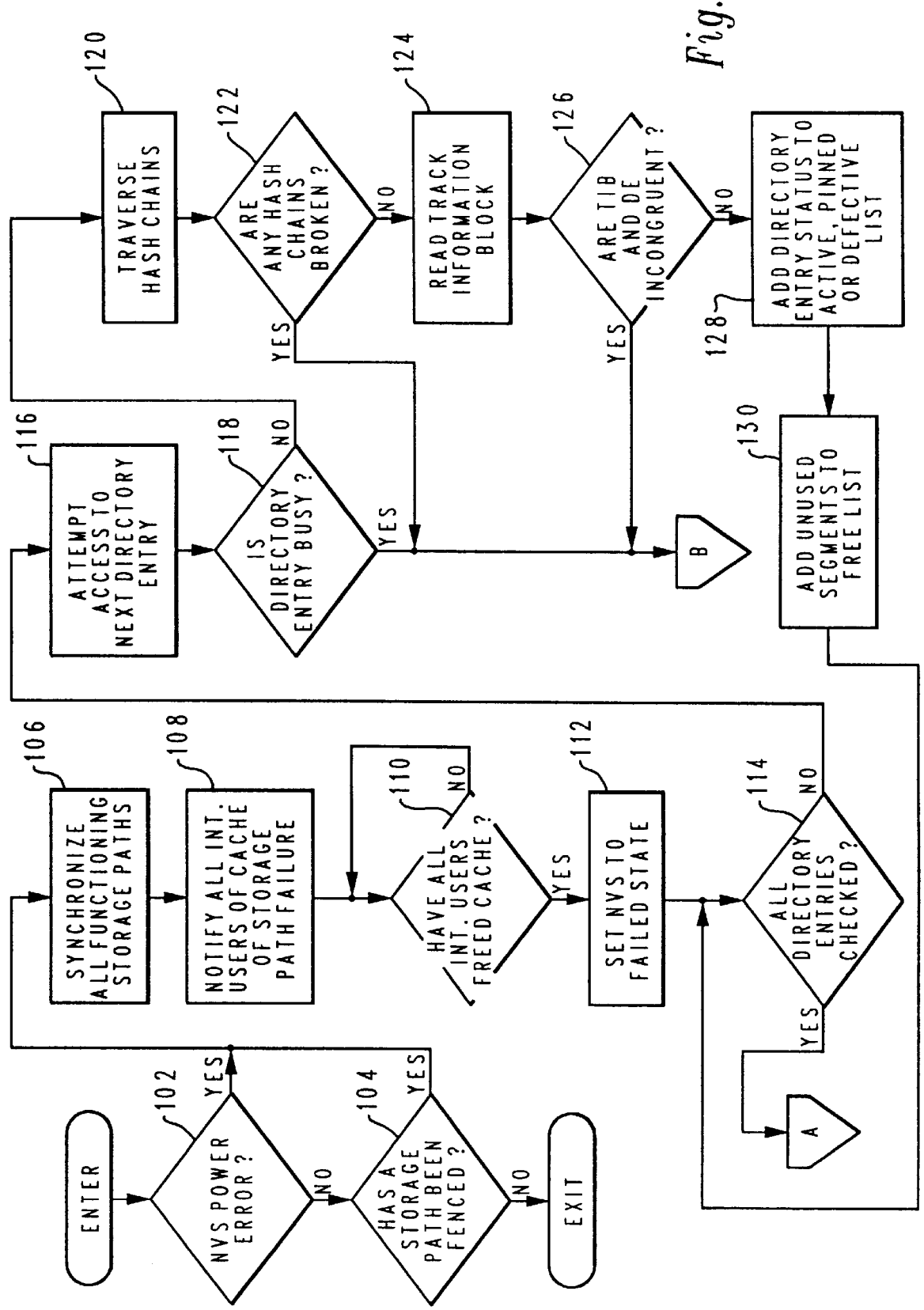
FIG. 4A is a logical flowchart of a process executable on a programmable storage controller for validating records in cache upon indication of storage path or power supply fault.
Figure 4B:
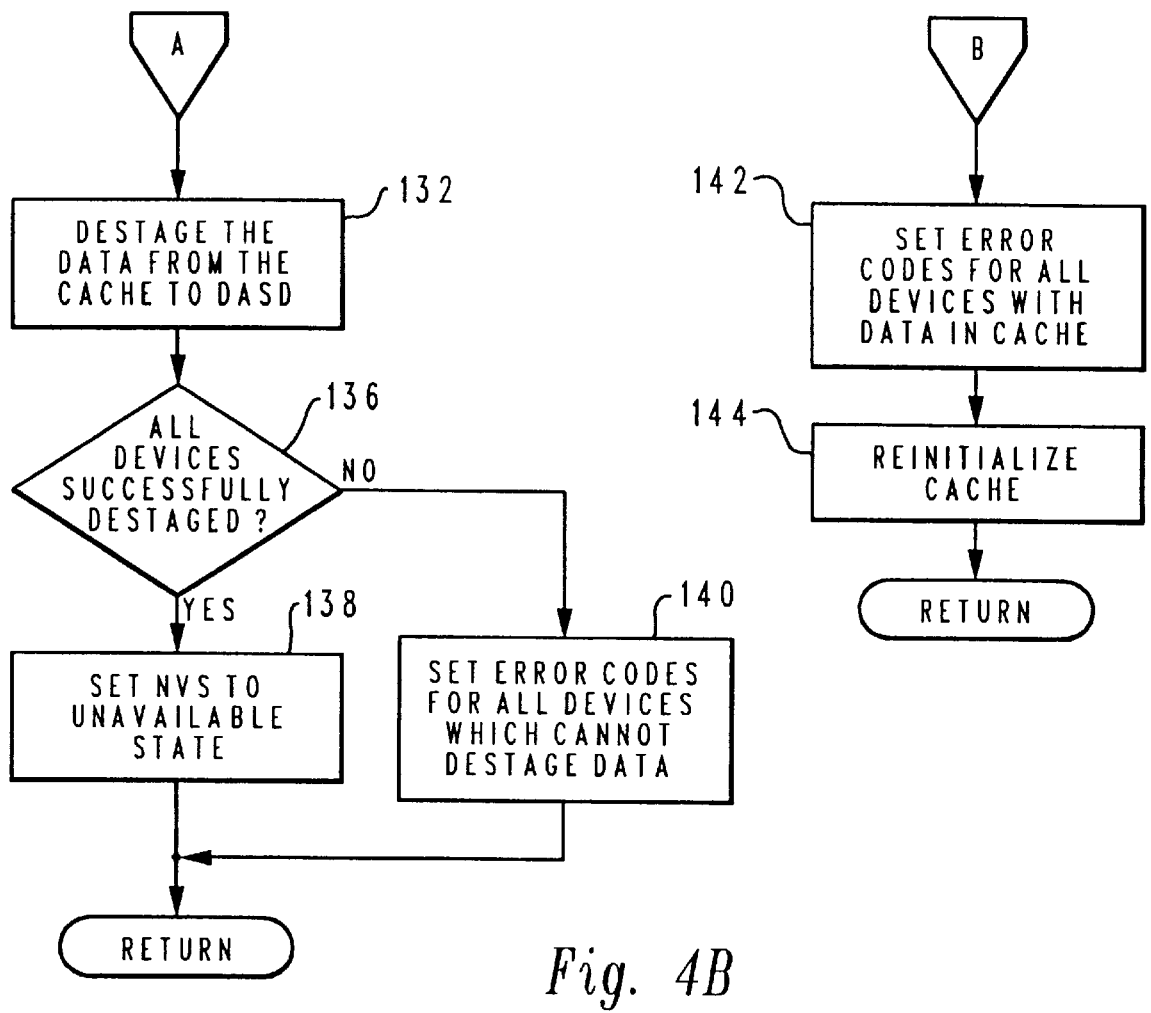
FIG. 4B is a continuation of FIG. 4A.
Figure 5:
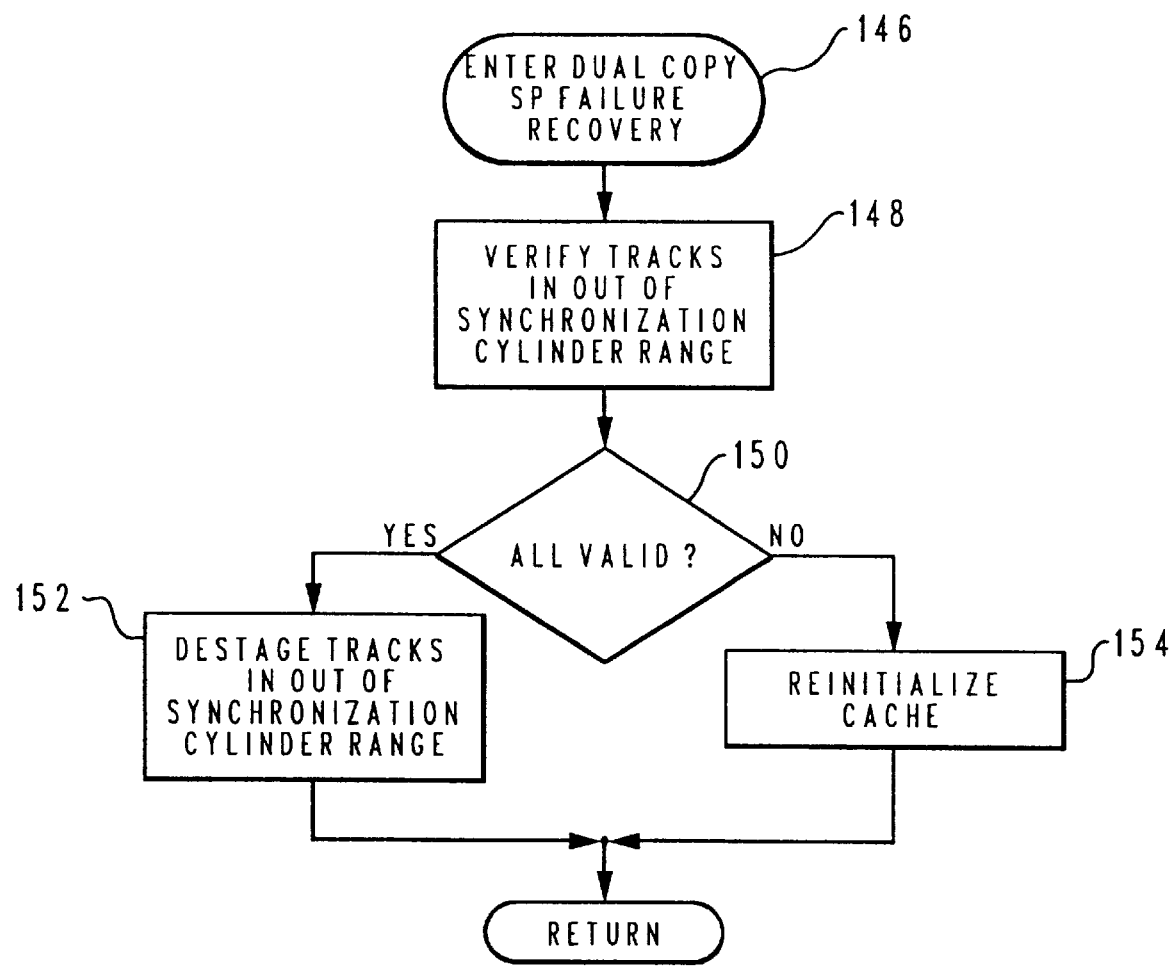
FIG. 5 is a logical flowchart of a process executable on a programmable storage controller for a variation of the process of FIG. 4A.

A first preferred embodiment of the invention is illustrated in FIGS. 4A and 4B and FIG. 5. The process is entered upon detection of a nonvolatile storage power error (step 102) or upon indication of storage path failure (step 104). To begin recovery, all functioning storage paths are synchronized (step 106). Recovery processes require cessation of use of the storage controller and accordingly all host computers and internal users utilizing the cache are informed of the storage path failure (step 108). Upon receipt of notification of a storage path failure the internal users of the cache release the cache. At step 110 the process marks time until indication is received that all internal users have freed the cache.

At step 112 the nonvolatile storage is set to the failed state. Step 114 controls looping through the directory entry validation process. Step 114 determines if all directory entries have been checked. Once all entries have been checked the process follows the YES branch to off page connector "A". The NO branch is followed until all directory entries have been examined. Along the NO branch step 116 is executed, which attempts access the next directory entry. Because all internal users have freed the cache no directory entry should be busy. At step 118 it is determined if the directory entry is busy. If the directory is busy, error has occurred. If a directory entry is busy the process is exited along the YES branch from step 118 through off page connector B.

The NO branch of from step 118 indicates continued evaluation of the integrity of the data structures. Along the NO branch to step 120 we begin use of the scatter index table to validate cache structures. The hash chains of the scatter index table are traversed to verify that no chains have been broken (steps 120 and 122). If no chains are broken, the track information block is read and compared (step 124) against directory entries. If there are incongruencies in the data of the track information block in the directory entries, the process is exited by off page connector B. If there are no incongruencies, step 128 is executed to add a status indication to one of the active, pinned or defective lists for tracks. If a segment is unused, the segment is added to a free list at step 130 and the process is returned to step 114 to determine if directory entries remain for evaluation.

FIG. 4B is the continuation of the process of FIG. 4A. Step 132 is reached from off page connector "A" once all data structures have been validated. Completion of recovery requires destaging modified data records from cache. Data from the cache is destaged to the appropriate DASD device at step 132. At step 136 it is determined if all devices successfully destaged. If YES, nonvolatile storage is set to the unavailable state, (step 138) and the process is exited. If failures occur in the attempt to destage, data error codes are set for all devices which failed and the process is exited (step 140). With NVS set to unavailable, fast write modify type operations will not be executable. Error codes set for any of the various DASD indicate that the recovery procedure cannot be used.

Step 142 is reached via off page connector "B". With execution of step 142, error codes are set for all devices with potential for data in NVS. Doing so serves to indicate to the host systems that access to these particular records will be prevented because DASD, which may not reflect modifications to some records. Next, step 144 is executed to reinitialize the cache.

The occasion of a failure of validation may not force cache reinitialization if redundant copies of records exist. The process of FIG. 5, including steps 146 to 154 can then be substituted for steps 142 and 144 above. In some systems redundant records exist in an out of synchronization cylinder range. Existence of such a range is verified at step 148. If all the tracks test is valid step 150 we may destage the tracks from the out of synchronization cylinder range (step 152). Failure of such verification will require reinitialization of the cache as indicated by step 154.

A second embodiment of the invention emphasizes quick recovery over recovery from a breadth of situations. The embodiment has particular application to airline reservation systems which maintain both a prime and a backup copy of records. Because a backup copy is present, only a system which can recover from a storage path failure in less time than it requires to retrieve the backup copy is of economic benefit.

Cache data structure congruency is enforced by cache locks. Cache locks serialize access to cache control structures among the storage paths. Only one storage path can own a lock at a given time. Upon recovery, the more conservative approach would assume that a control structure is incongruent if it was owned by a storage path when the storage path failed. However, greater speed in recovery is obtained by further refinement of the process. The locks are granted to the following resources: (1) the scatter index table, used to index directory entries; (2) the pools of available directory entries; (3) the lists of active directory entries (i.e. the MRU/LRU lists); (4) a hash table used to index locked shared data; and (5) the pool of prepared messages waiting to be off loaded to a host that describe the status of the subject to host user defined locks shared data. Locks are granted to items 3 and 4 with particular frequently.

Figure 6:
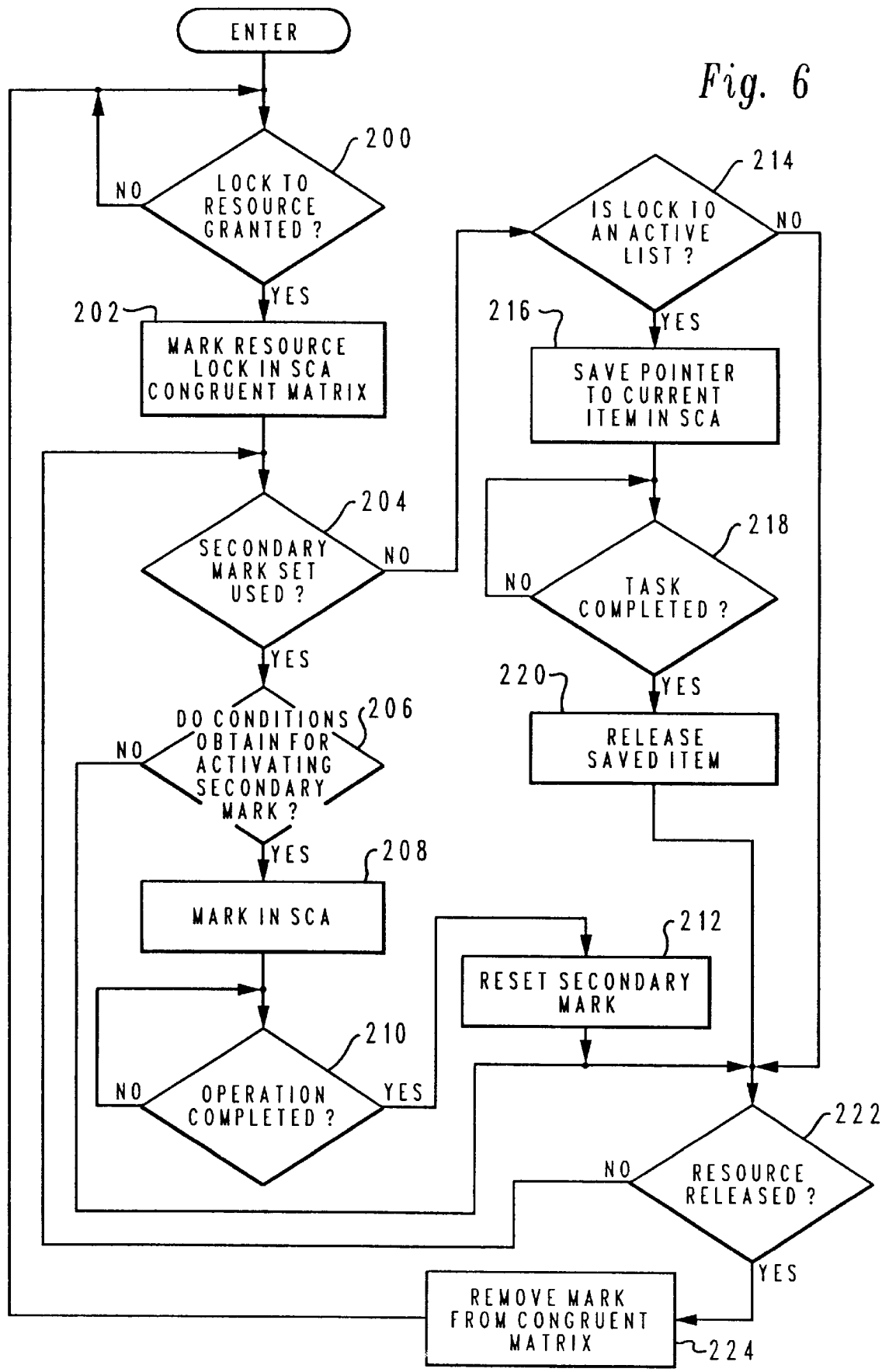
FIG. 6 is a logical flowchart of a process executable on a programmable storage controller allowing validation user records in cache upon indication of storage path or power supply fault.

The data structure used to support validation of user records is a congruency matrix which is maintained in the shared control arrays 64 and 66 by a background process illustrated in FIG. 6. The process is entered at step 200 which is a repeating test used to determine if a lock has been granted to a storage path for a resource. Incongruence does not occur absent existence of such a lock. After issuance of such a lock, step 202 is executed to mark the resources as locked in the congruency matrix.

However, a definition of incongruence equated with existence of a lock is often overboard. Secondary marks can be used to define situations actually associated with data consistency far more closely than a "resource lock." The concept of incongruence may also be extended to cover portions of code responding to a channel command word chain that creates fast write data in cache and the nonvolatile storage. Write operations to a single linked free list are set by a resource lock to include a whole period between receipt and release of the lock. However, the list becomes incongruent only during an actual write operation. For maximum performance, incongruence is signalled by setting secondary marks immediately prior to the write and resetting the mark directly upon completion of the write. The operation is set forth by process steps 204 (following the NO branch), 206, 208, 210 and 212.

Consider a channel command chain which is a write hit to a previously unmodified record. Further suppose that the channel end and device end signals have been presented to the host. The cache is in an incongruent state with a DASD record until the modified record is destaged. Such incongruence is marked in the matrix in the same fashion as the resource lock, but at a secondary level. Step 204 is used to determine if a channel command chain may include such a write operation. If a secondary mark set is used, the YES branch advances the process to step 206 where it is determined if the conditions required for setting a secondary mark in the congruency matrix exist. If the conditions do exist, the mark is set in step 208 and the operation is monitored until completed (step 210). With execution of step 212, the secondary mark is reset to indicate that incongruence no longer exists. If the NO branch from step 206 was taken no secondary level mark of incongruence is ever set. Such absence of activity would be associated with a read operation.

The NO branch from step 204 advances the process to step 214. If a lock has been granted to the MRU/LRU list, it will be detected at step 214. Recovery from a storage path failure where a lock exists only for MRU/LRU list is easily provided for by the expedient of saving a pointer to the accessed record (i.e. the new most recently used record) in the shared control array. The step of saving a pointer to the new most recently used record is indicated by step 216. Steps 218 and 220 indicate completion of a task and release of the memory in the shared control array in which the pointer was stored.

Following step 212, step 220 or the NO branch from step 214 it is determined if the resource has been released. If the resource has not been released, the process is returned to step 204. If the resource has been released, the congruency matrix is reset (step 224). Return to step 200 is indicated signifying return to the background process watching for the next lock of a resource.

Figure 7:
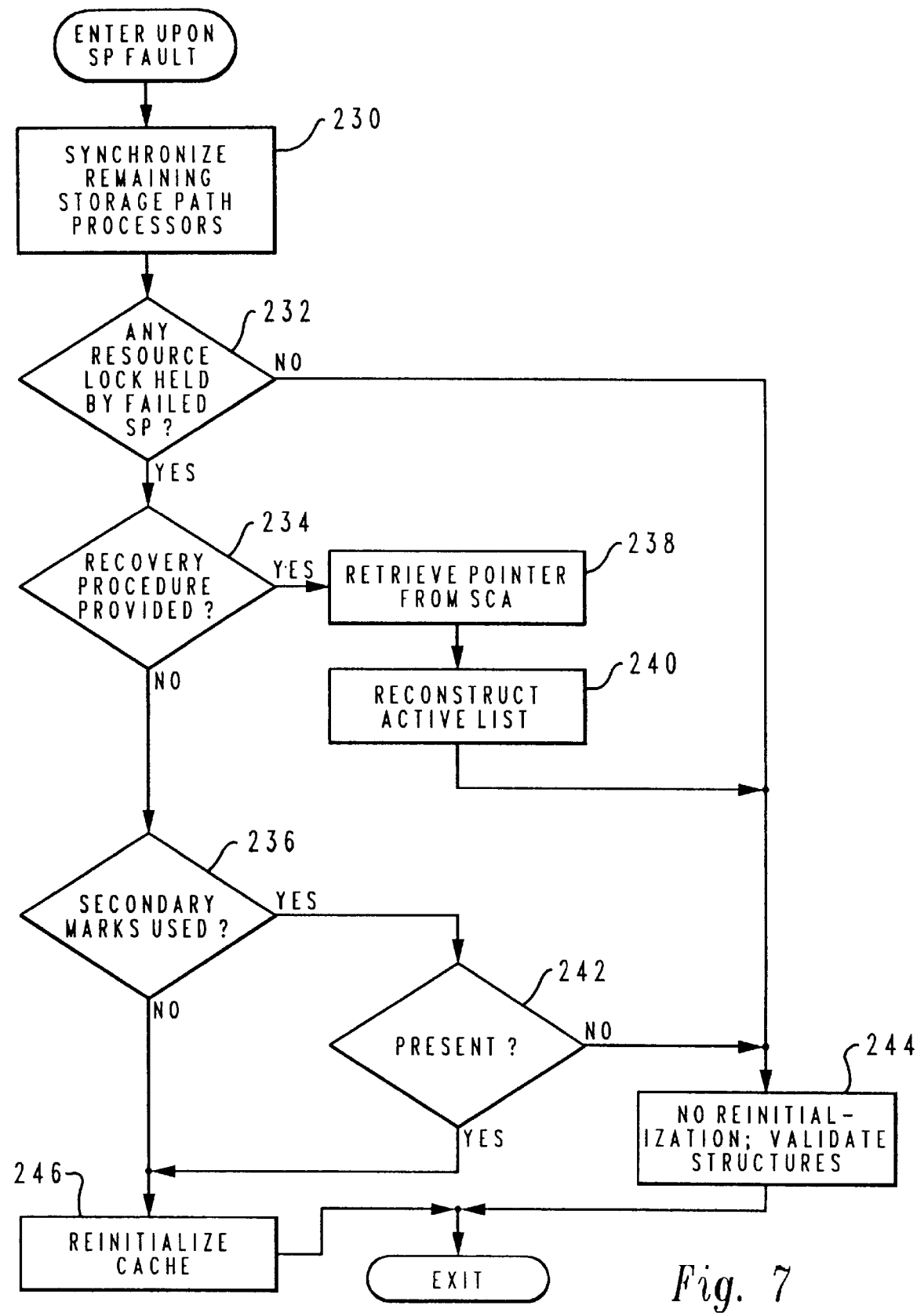
FIG. 7 is a logical flowchart of a process executable on a programmable storage executed in response to a power supply or storage path fault for validating user records in cache.

FIG. 7 illustrates response of the active storage paths upon a storage path fault. At step 230 the remaining functioning storage path processors are synchronized. Next, at step 232, the congruency matrix is interrogated to determine if any resource lock was held by the failed storage path. If none was held, processing is exited by the NO branch to step 244 for validation of all data structures. If, however, a resource lock was listed in the congruency matrix, step 234 is executed to determine if a recovery procedure is provided for the particular resource. If no procedure is provided, the process advances to step 236, where it is determined if the resource admits use of secondary marks. If secondary level marks may be used (the YES branch from step 236 to step 242), and are not present, the NO branch from step 242 leads to step 244. At step 244 the data structures are validated. If secondary marks are present, or if they are not available to the resource, the cache is reinitialized as indicated by step 246.

If at step 234 it was determined that a recovery procedure is provided, the YES branch from step 234 is taken. With execution of step 238 the pointer to the new most recently used record is retrieved from the shared control array. Next, the pointer is used to construct the updated, doubly linked MRU/LRU list (step 240). No initialization reinitialization will be required and the data cache control structures may be validated via step 244.

The second embodiment greatly reduces the occurrence of slow nonvolatile storage destages and all destages where failed storage paths are found congruent. The second embodiment has an advantage of simplicity over the first embodiment at the cost however of loss of broad applicability.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
    processor means for executing parallel processes;
    memory means connected to the processor means for storing a plurality of data structures for serial access by the parallel processes;
    means coupled to the memory means for indicating access to a selected data structure by a first parallel process;
    means coupled to said processor means and responsive to a fault occurring in the first parallel process for signalling the fault to a remaining parallel process; and
    the remaining parallel process including means responsive to the signalling of a fault for determining from the selected data structure if the first parallel process had access to the selected data structure at the time of the fault.

2. A data processing system as set forth in claim 1, wherein the means for indicating access further comprise:

means coupled to the memory means for storing a congruency list in the memory means; and means coupled to the memory means for setting entries in a congruency list to indicate ownership by a parallel process of data structures.

3. A data processing system as set forth in claim 2, and further comprising:

auxiliary memory for storing user records;

means coupled to the memory means for supporting caching of user record images on the memory means, wherein the caching supporting means include a record use data structure listing user record images stored in the memory means in order most recent access, means for hashing addresses of locations in auxiliary memory for user record images, a hashing table of indices for user record images, directory entry means for linking indices to memory means locations, and a hash table indexing active user record images;

a status indicator at a primary level in the congruency list within the memory means for indicating ownership status by a parallel process of an active user record image; and a secondary level in the congruency list within the memory means for indicating modification of a user record by a parallel process.

4. A data processing system as set forth in claim 3, and further comprising:

means responsive to signaling of a fault in a parallel process for checking the congruency list;

means responsive to a status indicator in the congruency list indicating ownership by a parallel process of the record use data structure for validating the data structures of the caching supporting means; and means responsive to a status indicator in the congruency list indicating ownership of an active user record, but not indicating modification of the user record for validating the data structures of the caching supporting means.

5. A data processing system as set forth in claim 1, and further comprising:

a plurality of direct access storage devices for storing user records by tracks;

means for supporting caching of user records in track images in the memory means, wherein the caching supporting means include a plurality of data structures further including a track use data structure listing track images stored in the memory means in order of most recent access to a user record therein, means for hashing addresses of locations in auxiliary memory for track images, a hash table of indices for track images, directory entry means for linking indices to memory means locations, and a track information block for each track image in the memory means for locating user records; and means responsive to access of a directory entry for marking the directory entry as busy.

6. A data processing system as set forth in claim 5, and further comprising:

means responsive to occurrence of a fault condition in a parallel process for determining access by the parallel process in fault to a directory entry;

means responsive to occurrence of a fault condition in a parallel process for determining integrity of the means for hashing;

means responsive to occurrence of a fault condition in a parallel process for determining if congruency of data in the track information blocks and the directory entries; and means responsive to lack of access by the parallel process in fault to a directory entry, to congruency of data in the track information blocks and to a continued integrity of the means for hashing for validating the data structures of the means for supporting caching.

7. A data processing system as set forth in claim 2, wherein the means for executing parallel processes includes a plurality of central processing units.

8. A data processing system including:

an auxiliary data storage system for storing a plurality of shared user records;

a memory for storing user record images;

processor means coupled to the auxiliary data storage system and the memory for executing parallel processes with serial access to the user record images in the memory;

means coupled to the memory for generating a congruency data structure in the memory;

means coupled to the memory and responsive to access by a parallel process to a user record image for purpose of modification of the user record image for marking the user record image in the congruency data structure;

means coupled to the memory and responsive to destaging of the modified user record image to the auxiliary memory for removing the marking of the user record image in the congruency data structure;

means coupled to the processor means for determining if a fault has occurred in a first parallel process;

means coupled to the memory are responsive to occurrence of a fault in the first parallel process for checking the congruency data structure for presence of markings for modified data structure images; and means coupled to the memory responsive to absence of markings for modified user record images in the congruency data structure for validating the user record images.

9. A data processing system as set forth in claim 8, and further comprising:

a plurality of host computer systems;

the processor means for executing parallel processes including a plurality of processing units;

means for passing channel programs from the host computer systems to the plurality of processing units for accessing the shared user records;

means coupled to the memory for supporting caching of user records in the memory means, wherein the caching supporting means include a plurality of data structures further including a record use data structure listing user records stored in the memory means in order most recent access, means for hashing addresses of locations in auxiliary memory for user records, a hash table of indices for user records and directory entry means for linking indices to memory locations; and means responsive to execution of a channel program by a processing unit for marking ownership of data structures during use by the processing unit.

10. A data processing system comprising:

a plurality of host computer systems;

an auxiliary data storage system coupled to the plurality of host computer systems for storing a plurality of shared user records;

a memory coupled to the plurality of host computer systems for caching user record images and for storing a plurality of data structures supporting caching of user record images;

processor means for executing parallel processes with serial access to the user record images in the memory and to the data structures;

means for passing access programs from the plurality of host computers to the processor means for executing parallel processes;

means for signalling an occurrence of a fault in a first parallel process to a second parallel process;

means coupled to the memory for accessing the plurality of data structures and determining internal consistency thereof; and means coupled to the memory responsive to a determination of internal consistency of the cache data structures for signalling validity of the user records.

11. A data processing system as set forth in claim 10, and further comprising:

a nonvolatile storage system coupled to the plurality of host computer systems for storing duplicate user record images for all user record images in memory not destaged to the auxiliary memory; and means responsive to fault in a power supply to the nonvolatile storage system for invoking the means for accessing.

12. A data processing system as set forth in claim 11, and further comprising:

means coupled to the memory for supporting caching of user records in track images in the memory, wherein the caching supporting means have a plurality of data structures including a record use data structure listing track images stored in the memory means in order most recent access to a user record therein, means for hashing addresses of locations in auxiliary memory for track images, a hash table of indices for track images, directory entry means for linking indices to memory locations, and a track information block for each track image in the memory means for locating user records.

13. A data processing system as set forth in claim 12, and further comprising:

means responsive to a signal of validity of the user records for destaging the user records to the auxiliary data storage system.

14. In a data processing system including a plurality of host computers, an auxiliary data storage system for storing records for access by the host computers, a memory, means for executing parallel processes and means supporting caching of user records from the auxiliary data storage system on the memory, a method of validating a new or modified image of a data record in the memory comprising the steps of:

generating data structures for supporting caching of user records in memory including, a record use data structure listing track images stored in the memory means in order of most recent access, means for hashing addresses of locations in auxiliary memory for user records, a hash table of indices for track images, directory entry means for linking indices to memory locations;

generating indicia of the congruency of data in the data structures and the user record images during execution of a parallel process;

storing the indicia to the memory;

responsive to fault in a parallel process reading the indicia of congruency; and validating the data structures and user records if the indicia of congruency hold.

* * * * *